United States Patent [19]

Rizzi

[11] 4,318,007

[45] Mar. 2, 1982

[54] CIRCUIT ARRANGEMENT FOR CONTROLLING THE ENERGIZATION OF A LOAD FROM A PLURALITY OF CURRENT SOURCES

[75] Inventor: Luigi Rizzi, Milan, Italy

[73] Assignee: Societa Italiana Telecomunicazioni Siemens S.p.A., Milan, Italy

[21] Appl. No.: 158,511

[22] Filed: Jun. 11, 1980

[30] Foreign Application Priority Data

Jun. 12, 1979 [IT] Italy .............................. 23477 A/79

[51] Int. Cl.[3] .............................................. H02J 1/10

[52] U.S. Cl. ........................................ 307/44; 307/57; 307/24; 307/297

[58] Field of Search ........................ 307/44, 19, 20, 24, 307/57, 362, 297; 323/312; 318/123, 248, 440; 238/150, 158

[56] References Cited

U.S. PATENT DOCUMENTS 4,144,463 3/1979 Sugiura ............................ 307/24 X

FOREIGN PATENT DOCUMENTS 1496294 12/1977 United Kingdom .

*Primary Examiner*—Lawrence R. Franklin
*Assistant Examiner*—S. D. Schreyer
*Attorney, Agent, or Firm*—Karl L. Ross

[57] ABSTRACT

A load, such as a logic network of the TTL type, is connected in parallel across a plurality of direct-current sources designed to maintain a substantially constant operating voltage. Each source includes a control unit which compares the load voltage with a reference level in order to stabilize the output voltage of an associated current generator at that level. If the generator current drops below a certain minimum value, however, a threshold sensor in the control unit raises the reference level up to an amount equaling about twice the maximum divergence possible between the reference levels of different control units, thereby ensuring that all sources contribute simultaneously to the load current.

7 Claims, 8 Drawing Figures

CIRCUIT ARRANGEMENT FOR CONTROLLING THE ENERGIZATION OF A LOAD FROM A PLURALITY OF CURRENT SOURCES

FIELD OF THE INVENTION

My present invention relates to a circuit arrangement for controlling the energization of a load with substantially constant voltage from a plurality of direct-current sources or feeders connected in parallel thereacross.

BACKGROUND OF THE INVENTION

Supply systems of this character are widely used in order to provide standby sources taking over the energization of the load whenever a previously active source drops out for any reason. In order to insure continued operation of other sources in the event of a failure of one source, each source is generally separated from the load by an isolating diode.

Each source conventionally includes a current generator with a so-called rectangular voltage/current characteristic, i.e. with an output voltage which is substantially independent of output current until the latter reaches a maximum value which it maintains while the voltage drops. In the operating range below that maximum value, the generator voltage is controlled by voltage-regulating circuitry including a comparator on the basis of a first input voltage proportional to load voltage and a second input voltage representing a fixed reference level. The first input voltage is obtained via a feedback connection across the load, that connection usually including a resistance network with a voltage divider providing a predetermined step-down ratio.

Even with careful calibration of the several current generators and the associated control units it is practically impossible to make the output voltages of the parallel-connected sources mutually identical. As a rule, therefore, the source with the highest output voltage will dominate inasmuch as the comparators of other voltage regulators will sense a load voltage exceeding the preset level and will therefore throttle the output of the associated current generator. Unless that generator is contributing a significant fraction of the load current, the resulting decrease in load voltage will be promptly compensated by an increase output current of the dominant source, thus causing a further cutback in the output of the remaining source or sources eventually leading to their complete deactivation. This may cause an untimely response of an alarm indicator connected upstream of the isolating diode of the deactivated standby source; more importantly, a subsequent failure of the dominant source will delay the reactivation of the standby source and will cause a momentary drop in load voltage which may be inadmissible in some instances, as where the load is a logic circuit of the TTL (transistor-transistor logic) type. Particularly in the latter instance a maintenance of the load voltage within 5% of its nominal value is essential.

Various attempts have been made to obviate the above drawbacks by insuring that each source supplies a substantial fraction of the total load current, e.g. a minimum of 10 to 20%, under all operating conditions except in the case of its own breakdown. One proposal involves the use of a feedback loop working into a comparison circuit which senses the total load current and controls the contribution of each operative source. This solution, however, is relatively complex even in the simple case of 1:1 redundancy in which the load is fed by only two sources each normally contributing half its current; it is therefore economically justified only with large-scale supply systems.

Another known possibility lies in the use of static feeders in lieu of the astatic current generators with rectangular characteristic referred to above, such feeders having an output voltage which varies inversely with output current. With a pair of static feeders it is necessary, for the purpose of insuring their simultaneous operation, to make their voltage drop equal to at least twice the maximum permissible deviation of the load voltage from its nominal value. This requirement, however, is unacceptable for most low-voltage sources (e.g. of 5 V) used in telecommunication systems.

Still another prior-art solution resides in feeding back the output voltage of each source, taken at a point upstream of its isolating diode, rather than the load voltage available downstream of that diode. Such an arrangement stabilizes the output voltage of each source at a preset value even if that source does not contribute to the load current. The actual load voltage, however, may differ significantly from the stabilized source voltage, on account of current-dependent voltage drops across the diode and in the supply conductors, to an extent which could be as high as 0.5 V. That difference could be acceptable with supply systems operating at high or medium voltages (e.g. of 100 V or 24 V) but not in the low voltage range of about 5 V used in a telecommunication system with tolerance limits of about 2 to 3%.

OBJECT OF THE INVENTION

The object of my present invention, therefore, is to provide an improved circuit arrangement which avoids the aforestated disadvantages of earlier solutions in preventing the complete deactivation of d-c sources contributing to the energization of a common load, especially but not exclusively in a telecommunication system.

SUMMARY OF THE INVENTION

For this purpose, pursuant to my present invention, I provide each source with voltage-regulating means comprising, in addition to the aforementioned voltage comparator working into a control input of the associated current generator, a current sensor in series with that generator and electronic switch means responsive to this sensor and connected to the voltage comparator for modifying the ratio of its two input voltages to raise the effective value of the reference level (represented by one of these input voltages) whenever the output current of the generator drops below a predetermined minimum magnitude.

As more particularly described hereinafter, the rise in the effective value of the reference level can be accomplished by inserting an ancillary resistor in a resistance network forming part of the feedback connection from which the input voltage proportional to load voltage is obtained. Such a result, however, can also be attained by varying the reference level itself while leaving unchanged the step-down ratio of the resistance network; evidently, both measures could be used jointly.

The electronic switch means of my improved voltage regulator may comprise a threshold comparator having one input connected to a low-ohmic resistor acting as the current sensor, another input of this comparator being connected to a tap on a second voltage divider inserted between two points of fixed potentials. The same low-ohmic resistor and the second voltage divider may also be connected to respective inputs of a differential amplifier which has an output connected to the control input of the current generator and, in a manner known per se, prevents a rise in the output current thereof beyond a predetermined limit.

BRIEF DESCRIPTION OF THE DRAWING

The above and other feature of my invention will now be described in detail with reference to the accompanying drawing in which.

SPECIFIC DESCRIPTION

Figure 1:
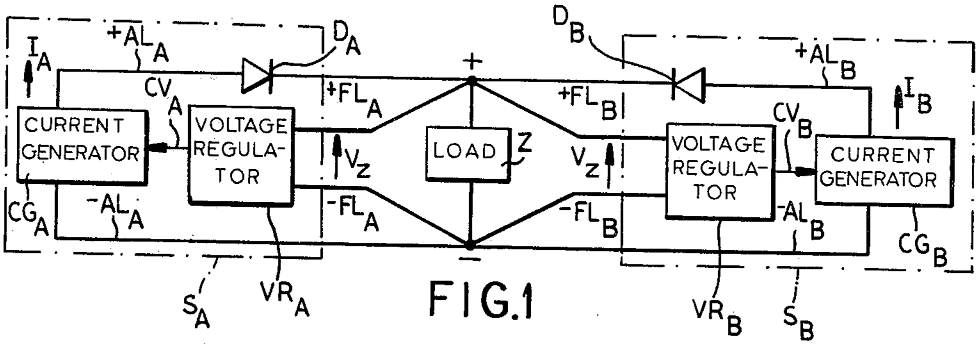
FIG. 1 is a block diagram of a two-source supply system embodying my invention.

The system shown in FIG. 1 comprises a load Z, e.g. a logic circuit of TTL type, which is to be maintained constantly energized with a stabilized voltage from two sources or feeders respectively designated $S_A$ and $S_B$. Source $S_A$ includes a current generator $CG_A$ of the aforedescribed astatic type, an associated voltage regulator $VR_A$ supplying a control voltage $CV_A$ to that generator, and an isolating diode $D_A$ in a positive supply lead $+AL_A$ extending from generator $CG_A$ to load Z; the negative supply lead has been designated $-AL_A$. The load voltage $V_z$ is delivered to regulator $VR_A$ via two feedback leads $+FL_A$ and $-FL_A$. The output current produced by generator $CG_A$ has been designated $I_A$.

Corresponding elements of source $S_B$, which is structurally identical with source $S_A$, have been designated by the same references with replacement of subscript A by subscript B.

Figure 2:
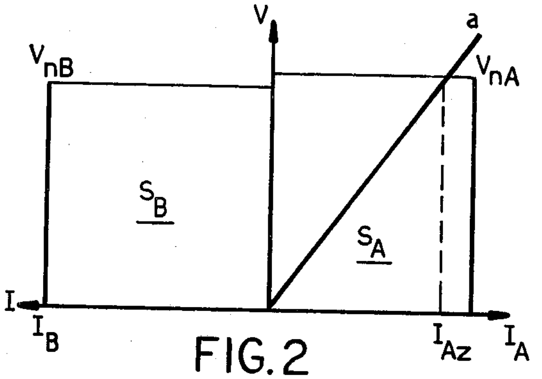
FIGS. 2 and 3 are graphs relating to a conventional mode of operation of the system of FIG. 1.

Because of unavoidable manufacturing tolerances, and/or on account of changes occurring in the course of time, the output voltages of generators $CG_A$ and $CG_B$ in the presence of a given load voltage $V_z$ will not be strictly identical. In FIG. 2 it has been assumed that source $S_A$ has, under otherwise equal conditions, a normal output voltage $V_{nA}$ slightly higher than the normal output voltage $V_{nB}$ of source $S_B$. Also shown in FIG. 2 is a straight line a representing the d-c load resistance; thus, source $S_A$ will deliver a load current $I_{Az}$ in the absence of a contribution from source $S_B$.

Figure 3:
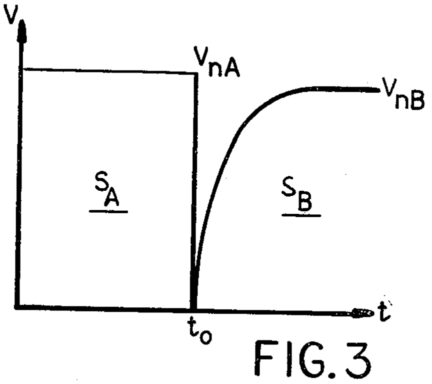

With the conventional mode of operation, regulator $VR_B$ could in fact deactivate the associated current generator $CG_B$ upon sensing the higher voltage $V_{nA}$ developed across the load Z. In such a case, a breakdown of course $S_A$ at an instant $t_o$ (FIG. 3) would result in a rapid but not instantaneous rise of the output voltage of source $S_B$ to its own operating level $V_{nB}$, yet the load voltage will suffer a transient dip which may be detrimental to the operation of load Z.

Figure 4:
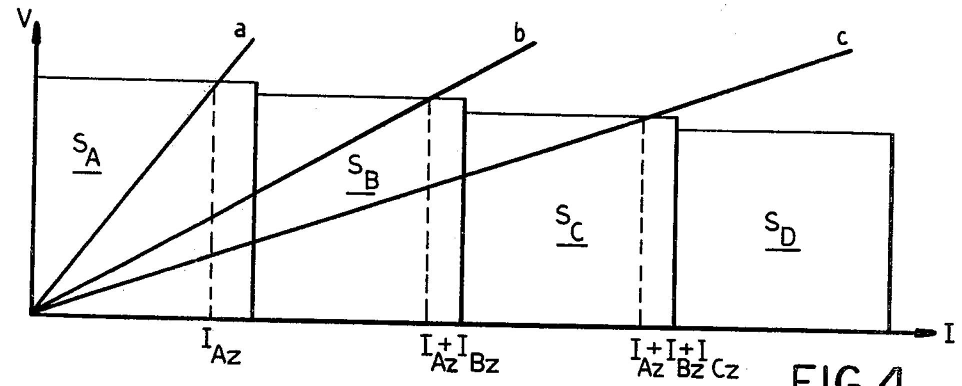
FIGS. 4 and 5 are graphs similar to FIGS. 2 and 3 but relating to the operation of an expanded supply system with four parallel sources.

An analogous situation exists in the presence of more than two feeders, e.g. four sources $S_A$, $S_B$, $S_C$ and $S_D$ as diagrammatically indicated in FIG. 4. With only source $S_A$ active and a load resistance represented by a line a as in FIG. 2, failure of that source will bring on the standby source $S_B$ (assumed to have the next-lower operating voltage) in a manner similar to that described with reference to FIG. 3. In both sources $S_A$ and $S_B$ energize the load with a combined current $I_{Az}+I_{Bz}$, and with a load resistance as represented by a line b, a breakdown of either one of these active sources will call into play the standby source $S_C$ assumed to have the third-highest operating voltage. The dip in load voltage will then not be as severe as in the previous instance but will still amount to about 50%.

Figure 5:
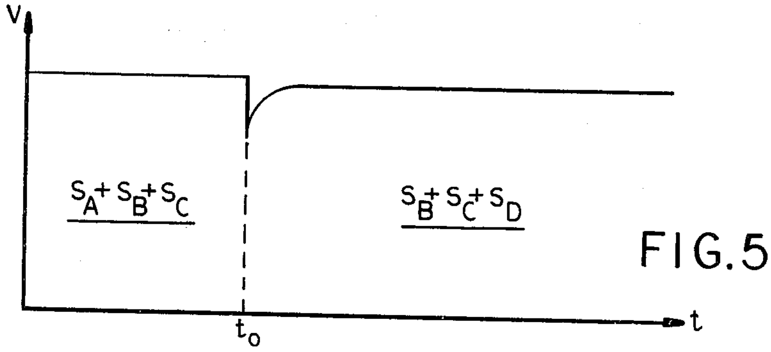

If all three sources $S_A$, $S_B$, $S_C$ feed the load (whose resistance is represented by a line c) with a combined current $I_{Az}+I_{Bz}+I_{Cz}$, failure of one of these sources (e.g. feeder $S_A$) will activate the fourth source $S_D$ to cause yet a smaller voltage dip on the order of 30%. Even that dip, seen in FIG. 5, is still unacceptable for sensitive loads of, say, the TTL type.

Figure 6:
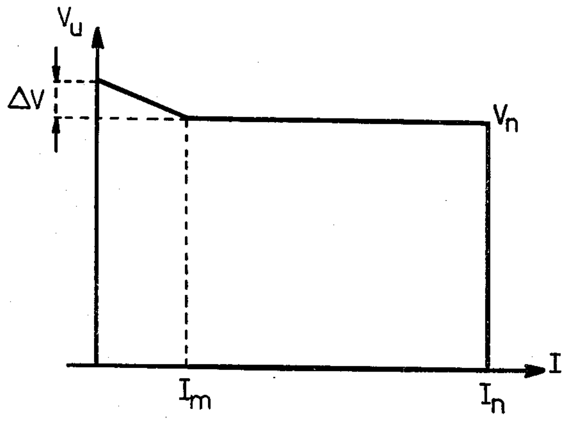
FIGS. 6 and 7 are further graphs showing the effect of my present improvement over the mode of operation represented by FIGS. 2-5.

With the voltage regulators $VR_A$ and $VR_B$ of FIG. 1 operating in accordance with my present invention, their output voltages $V_u$ will begin to rise above the normal level $V_n$ as soon as their current I drops below a minimum magnitude $I_m$ as shown in FIG. 6. With a total load current I, the ratio $I_m/I_n$ could be about 20%, for example. The maximum voltage rise $\Delta V$ (for $I=0$) might be, for instance, 1% of the normal operating voltage $V_n$. With a two-feeder system such as that shown in FIG. 1, the increment $\Delta V$ should be equal to at least twice the maximum anticipated divergence between the normal operating levels $V_{nA}$ and $V_{nB}$ of the two sources.

Figure 7:
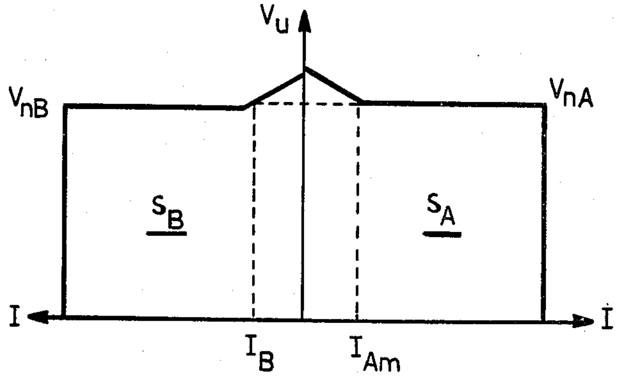

This has been illustrated in FIG. 7 which shows the less active source $S_B$ still supplying a fractional load current $I_B$ at an operating point where its output voltage has linearly risen from its normal level $V_{nB}$ to the slightly higher level $V_{nA}$ of the more active source $S_A$. The current threshold of the latter source has been indicated in this Figure at $I_{Am}$.

Figure 8:
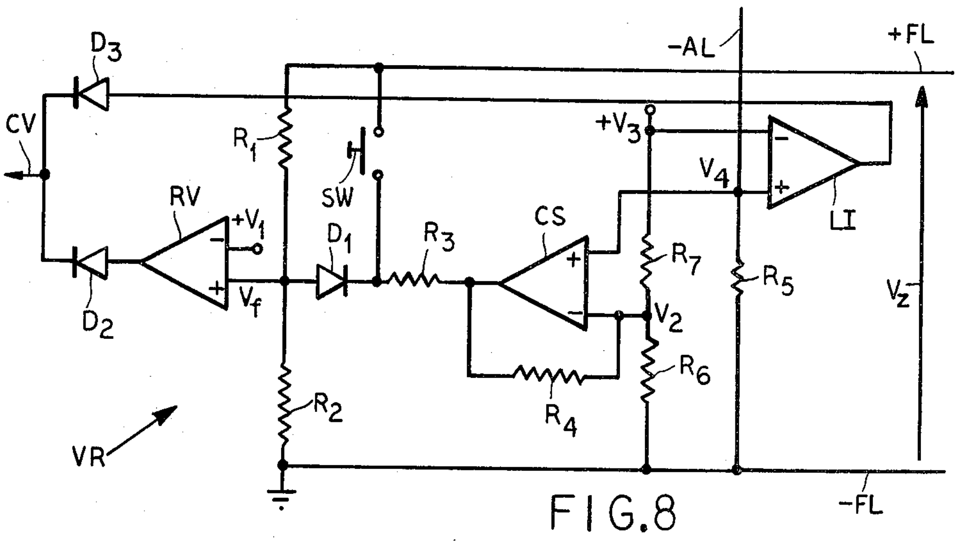
FIG. 8 is a circuit diagram representative of a control unit included pursuant to my invention in each of the sources of FIG. 1.

Reference will now be made to FIG. 8 which shows a voltage regulator VR according to my invention representative of either of the two regulators $VR_A$ and $VR_B$ seen in FIG. 1. The regulator comprises a voltage comparator RV, in the form of a differential amplifier, having one input connected in the usual manner to a tap of a voltage divider formed by two resistors $R_1$ and $R_2$ which are serially connected across feedback leads +FL and −FL. The second input of amplifier RV receives a fixed reference potential $+V_1$. This amplifier thus constitutes a comparison means with a first input circuit including the resistance network $R_1$, $R_2$ and a second input circuit shown as a simple lead. When the feedback voltage $V_f$ proportional to load voltage $V_z$ deviates from reference voltage $V_1$, amplifier RV emits an error signal CV by way of a diode $D_2$ to the control input of the associated current generator. To the extent so far described, the voltage regulator shown in FIG. 8 is entirely conventional.

In accordance with my present invention, an operational amplifier CS representing an electronic switch means receives a reference voltage $V_2$ on its inverting input connected to a tap of a second voltage divider formed by two resistors $R_6$ and $R_7$ which lie in series between a point of fixed biasing potential $+V_3$ and the negative feedback lead −FL. The negative supply conductor −AL, tied to the same load terminal (here shown to be grounded) as lead −FL, contains a low-ohmic resistor $R_5$ which acts as a current-sensing means and whose ungrounded terminal is connected to the noninverting input of amplifier CS. The output of this amplifier is connected in series with an ancillary resistor $R_3$ and a diode $D_1$ to the junction of resistors $R_1$ and $R_2$ supplying the feedback voltage $V_f$ to an input of comparator RV. Amplifier CS, which is provided with a feedback resistor $R_4$, acts as an electronic switch which allows current to pass through resistor $R_3$ whenever the reference voltage $V_2$ on its inverting input exceeds a voltage $V_4$ on its noninverting input determined by the generator current which traverses the sensing resistor $R_5$. Under these circumstances, therefore, resistor $R_3$ becomes part of a shunt branch of the network including voltage divider $R_1$, $R_2$ which lowers the feedback voltage $V_f$, thereby raising the ratio $V_1/V_f$ and reducing the emitted error signal or control voltage CV. As a result, the associated current generator becomes more active and the current sensed by resistor $R_5$ increases until equilibrium is re-established.

FIG. 8 also shows another differential amplifier LI receiving voltages $V_3$ and $V_4$, this amplifier having an output connected via another diode $D_3$ to the control input of the associated current generator in order to limit its output current in a manner known per se.

It will be apparent that resistor $R_3$ could be made part of a nonillustrated network generating the fixed reference voltage $+V_1$. In that instance, with suitable modification of the input connections of amplifier CS, the level of voltage $+V_1$ would be raised whenever voltage $V_4$ becomes less than voltage $V_2$. It will also be understood that resistors $R_6$ and $R_7$ could jointly form a branch of a larger voltage divider establishing the biasing potential $+V_3$. Also, sensing resistor $R_5$ may be inserted in the positive instead of the negative supply conductor, with resistor $R_3$ shunting divider branch $R_1$ instead of $R_2$.

Feedback resistor $R_4$ smooths the transition between the conductive and the nonconductive state of operational amplifier CS. Diode $D_1$ is not indispensable but is designed to prevent changes in the error signal CV emitted by amplifier RV when the generator current is above the threshold $I_m$ (FIG. 6) but below a value which would cause limiter LI to respond.

A manual switch SW can be used to apply positive blocking voltage from lead +FL to the cathode of diode $D_1$ whenever it is desired to let the regulator VR operate in the conventional mode.

I claim:

1. In a system for energizing a load with a substantially constant voltage from a plurality of direct-current sources connected in parallel thereacross with interposition of respective isolating diodes, each source including a current generator with an output voltage which is substantially independent of output current up to a certain maximum current, each source further including voltage-regulating means with a feedback connection across the load for comparing the load voltage with a reference level and for controlling said current generator to maintain the output voltage thereof at said reference level, the improvement wherein said voltage-regulating means comprises:

comparison means with a first input circuit including said feedback connection supplying a first input voltage proportional to load voltage and a second input circuit connected to a supply of second input voltage representing said reference level, said generator having a control input connected to said comparison means;

current-sensing means in series with said generator; and electronic switch means responsive to said current-sensing means and connected across part of one of said input circuits for modifying the ratio of said input voltages to raise the effective value of said reference level upon the output current of said generator dropping below a predetermined minimum magnitude, thereby increasing the contribution of said generator to the energization of the load.

2. The improvement defined in claim 1 wherein said feedback connection comprises a resistance network establishing a step-down ratio between said load voltage and said first input voltage, said switch means including a threshold comparator in series with an ancillary resistor connected to a junction between said network and an input of said comparison means.

3. The improvement defined in claim 2 wherein said resistance network comprises a first voltage divider, said current-sensing means including a low-ohmic resistor connected to one input of said threshold comparator, another input of said threshold comparator being connected to a tap on a second voltage divider inserted between two points of fixed potentials.

4. The improvement defined in claim 3 wherein each source further includes a differential amplifier with a pair of inputs respectively connected to said low-ohmic resistor and to said second voltage divider and with an output connection to said control input for preventing a rise in said output current beyond a predetermined limit.

5. The improvement defined in claim 3, further comprising a protective diode inserted between said ancillary resistor and said junction for preventing a modification of said ratio tending to lower said effective value.

6. The improvement defined in claim 5, further comprising disabling means operable to apply a blocking bias to said protective diode.

7. The improvement defined in claim 2, 3, 4, 5 or 6 wherein said threshold comparator comprises an operational amplifier with a resistive feedback path.

* * * * *